April 4, 1944. M. A. WECKERLY 2,346,120
WEIGHING SCALE
Filed July 16, 1940 4 Sheets-Sheet 2
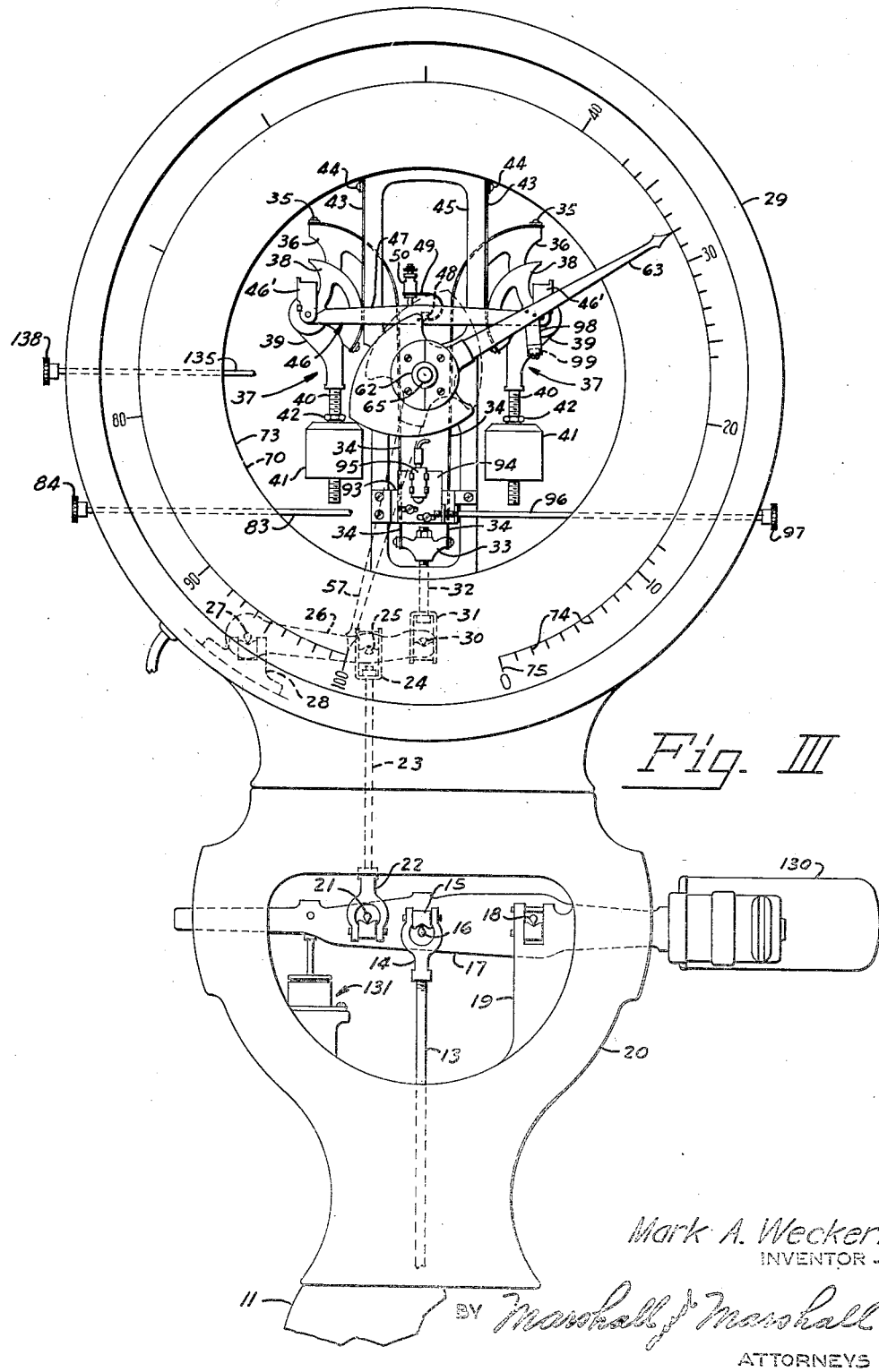
Fig. III
Mark A. Weckerly
INVENTOR
BY Marshall & Marshall
ATTORNEYS April 4, 1944.  M. A. WECKERLY  2,346,120
WEIGHING SCALE
Filed July 16, 1940  4 Sheets-Sheet 3
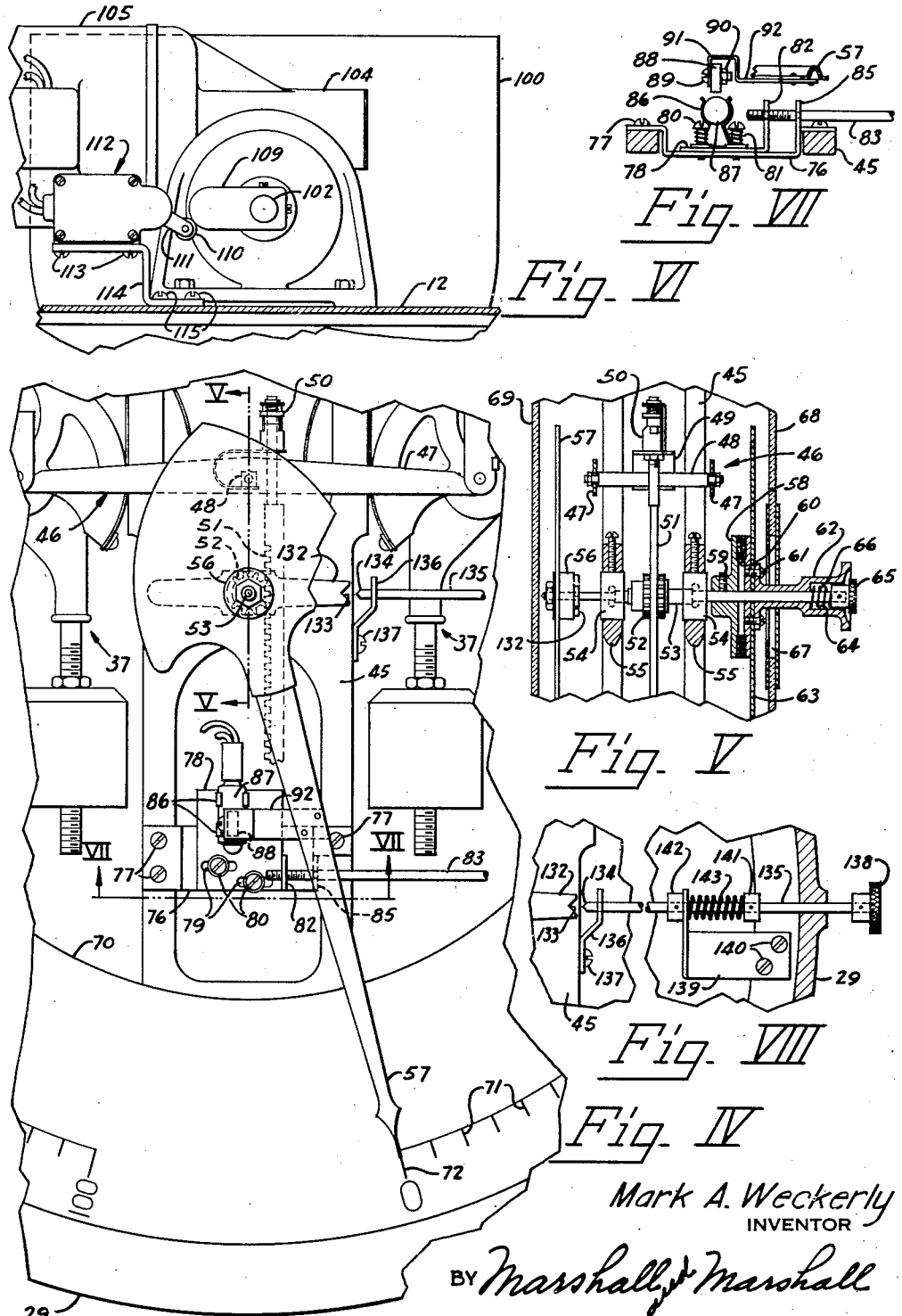
Mark A. Weckerly
INVENTOR
BY Marshall & Marshall
ATTORNEYS

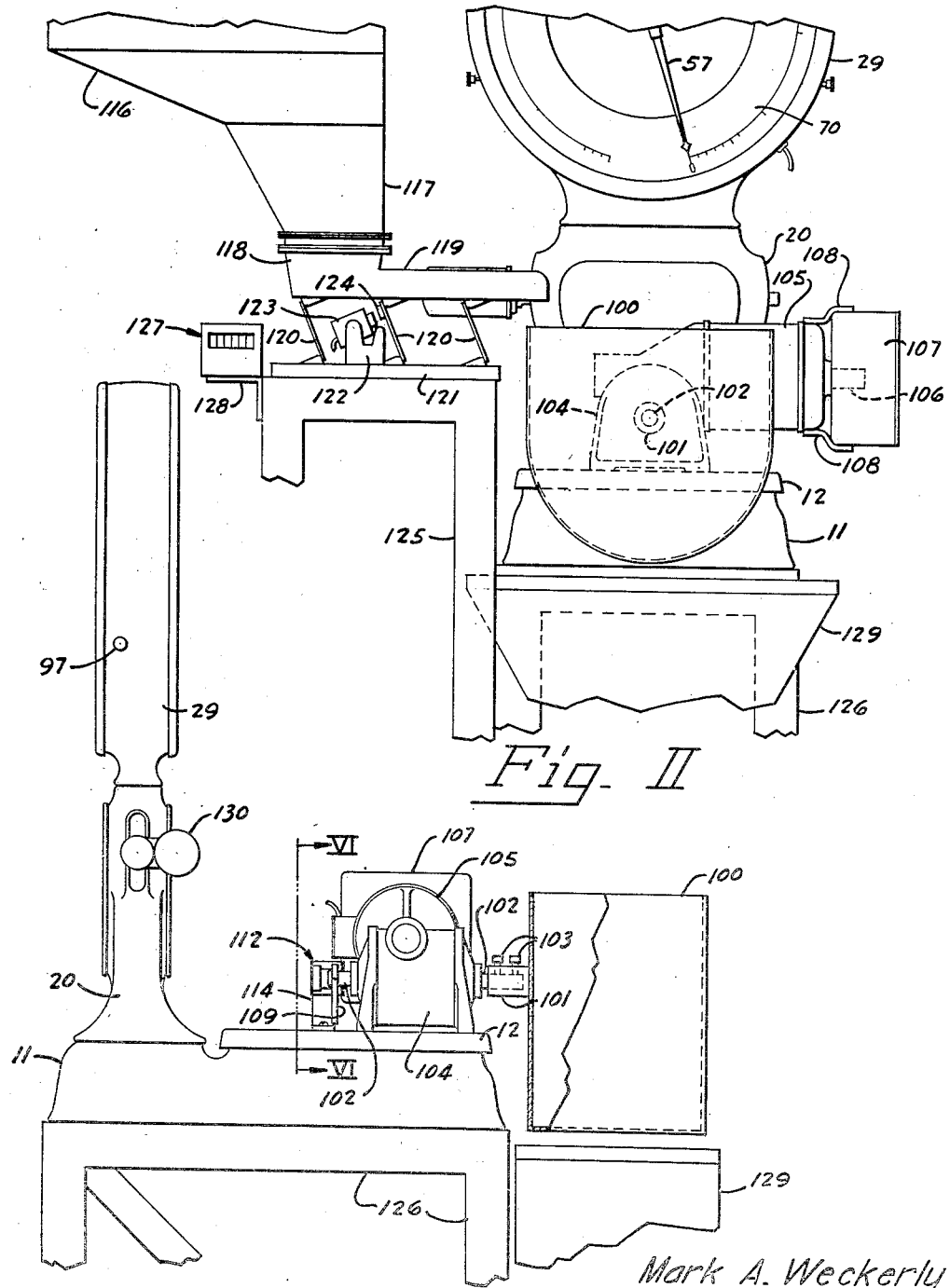

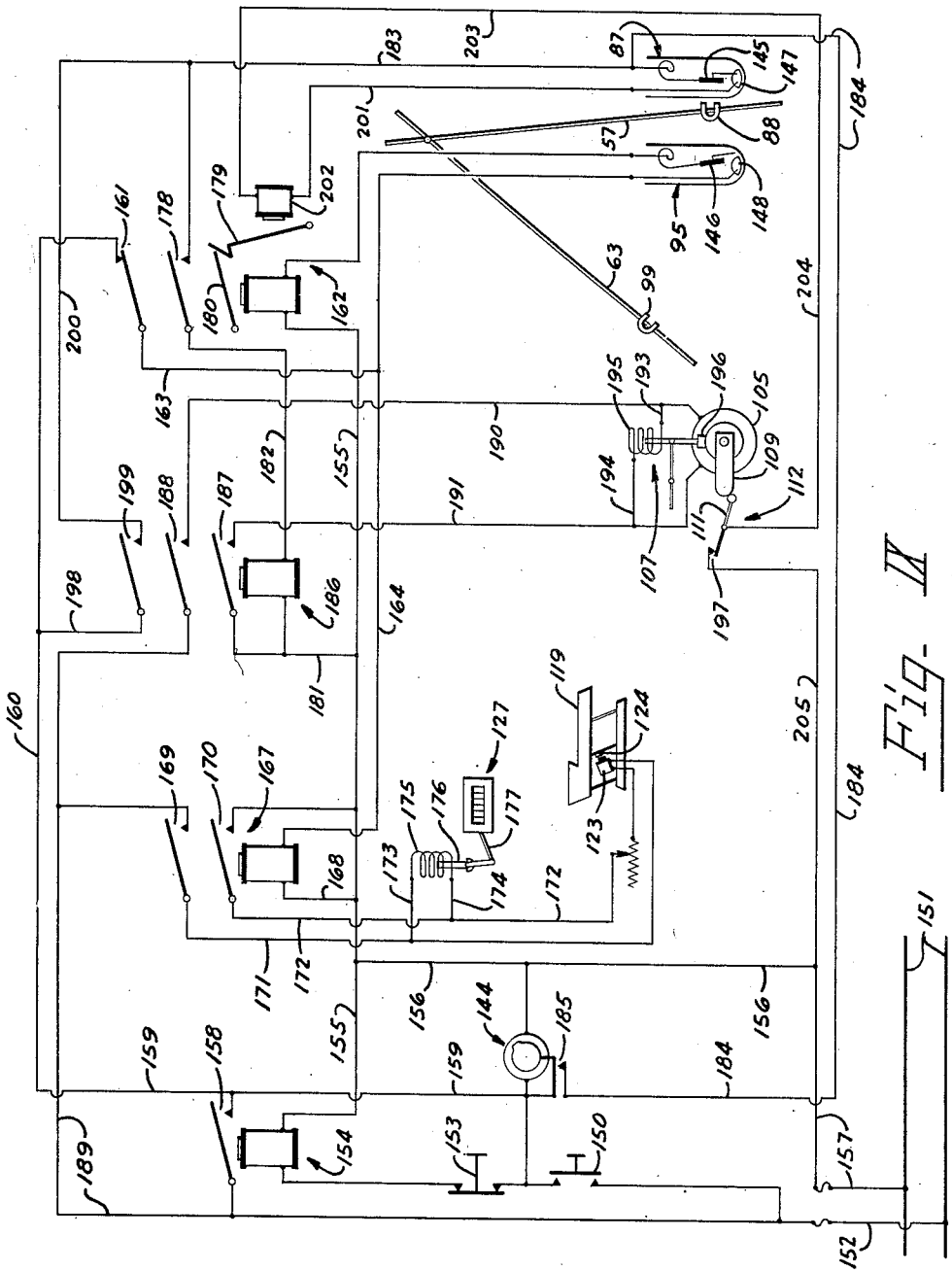

Patented Apr. 4, 1944

2,346,120

UNITED STATES PATENT OFFICE 2,346,120

WEIGHING SCALE

Mark A. Weckerly, Toledo, Ohio, assignor to Toledo Scale Company, Toledo, Ohio, a corporation of New Jersey Application July 16, 1940, Serial No. 345,788

10 Claims. (Cl. 249—20)

This invention relates generally to weighing scales, and more particularly to weighing scales adapted to determine automatically and sequently loads of equal weight.

Scales of this type are used for a large variety of purposes, for example, in continuous batching operations, charging continuously operating furnaces, automatically weighing material as it passes from a hopper on one level to another hopper on a lower level and in filling containers with loads of equal weight.

The principal object of this invention is the provision of improved means for accurately determining loads of equal weight.

Another object is the provision of improved means for determining loads of equal weight and discharging said loads at timed intervals.

Another object is the provision of improved means whereby the operation of load feeding means is inhibited until the previous load has been entirely discharged.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a side elevational view of the device embodying the invention.

Fig. II is a fragmentary front elevational view thereof and showing the material feeding means.

Fig. III is an enlarged rear elevational view illustrating the load counterbalancing mechanism, load indicating means and control means in greater detail.

Fig. IV is a still further enlarged fragmentary front elevational view of a portion of the indicating means and control means.

Fig. V is a fragmentary sectional view substantially along the line V—V of Fig. IV.

Fig. VI is an enlarged fragmentary side elevational view as seen from along the line VI—VI of Fig. I, illustrating in detail hopper control means.

Fig. VII is a fragmentary view of one of the magnetic control switches substantially as seen from along the line VII—VII of Fig. IV and illustrating the relation to its actuating and adjusting means.

Fig. VIII is an enlarged fragmentary elevational view in section, showing indicator positioning means; and, Fig. IX is a diagram of the electrical circuits.

Referring to the drawings in detail:

The device as illustrated in Fig. I comprises a base 11 in which is mounted, in the usual manner, a platform lever system (not shown) and pivotally mounted upon this lever system is a platform 12. The free end of this lever system pivotally engages a rod 13 having a stirrup 14 provided with a bearing 15 at its upper end with which it engages a load pivot 16 extending laterally from the sides of a lever 17 which, by means of a pivot 18, is fulcrumed upon suitable bearings in a bracket 19 in the interior of an expanded portion of a column-like casing 20. This casing is erected upon a deck-like portion of the base 11 immediately in back of the platform 12. The lever 17, by means of a power pivot 21 which is in spaced relation to the pivots 16 and 18, engages a suitable bearing in a stirrup 22 on the lower end of a connecting rod 23 whose upper end, by means of a suitable stirrup 24, engages a load pivot 25 in a pendulum actuating lever 26. This lever, by means of a pivot 27, is fulcrumed upon a suitable bearing in a bracket 28 in the interior of a substantially watchcase-shaped housing 29 which surmounts the column-like casing 20.

A nose pivot 30, fixed in the free end of the lever 26, engages a suitable bearing in a stirrup 31 which, by means of a short rod 32, is suspended from an equalizer 33. Secured to faces of the equalizer 33 are the lower ends of flexible metallic ribbons 34 whose upper ends overlie and are clamped as at 35 to the upper ends of power sectors 36 which are parts of load counterbalancing pendulums 37. Each of these load counterbalancing pendulums, in addition to the power sector 36 which is mounted on a shaft extending horizontally through its center of rotation, comprises a pair of fulcrum sectors 38, one of these sectors 38 being fixed to the aforementioned shaft on each side of the power sector. A pendulum body 39, also clamped on the shaft, extends downwardly and has studded in its lower end a stem 40 upon which a pendulum weight 41 is adjustably seated and adapted to be locked in adjusted position by means of a locknut 42.

Ribbons 43, whose upper ends are clamped as at 44 to a pendulum frame 45 suitably positioned and fixed in the interior of the housing 29, have their lower ends secured to the lower ends of the faces of the fulcrum sectors thus serving to support the pendulums 37. Pivotally engaging the ends of the shafts extending through the pendulums at their centers of rotation is a frame 46 comprising a pair of so-called compensating plates 47 and connecting yokes 46', one of these plates being stationed on each side of the pendulums. At a point midway between the points of pivotal attachment of the compensating plates 47 to the pendulums 37 tenons of a square shaft 48 are supported in openings in these compensating plates (Fig. V) and to this square shaft is fastened a resilient, substantially C-shaped member 49. The member 49 supports a rack foot member 50 and a rack 51, dependingly mounted therein, engages a pinion 52 circumjacently fixed on an indicator shaft 53. This indicator shaft is mounted in ball bearings 54 fixed in apertures in horizontally extending flanges 55 of the pendulum frame 45. A portion of this shaft 53, which extends towards the front of the scale, has mounted thereon, by means of a suitable hub 56, an indicator 57. Fixed to the shaft 53 on the opposite side of the pendulum frame 45 is a clutch plate 58 locked thereon by means of a set screw 59. A second clutch plate 60 is slidably mounted upon the shaft so that it may frictionally engage the clutch plate 58 and secured to this clutch plate, by means of screws 61, is a finger grip 62, there being an indicator 63 clamped between the two members 60 and 62. This finger grip is provided with a counterbore 64 (Fig. V) and extending partly into this counterbore and pinned to the end of the shaft 53 is a button 65, a compression spring 66 circumjacently mounted upon the shaft is seated in the counterbore and its bias urges the clutch plates 58 and 60 into gripping engagement. The finger grip 62 projects through an opening 67 in a sheet of glass 68 which encloses the rear of the housing 29. A similar, but imperforate sheet of glass 69 encloses the front of this housing.

Fixed in the housing 29, immediately in back of the indicator 57 and cooperating therewith, is a chart 70. This chart has printed thereon a series of weight indicia 71 including a zero indicium 72. These indicia are arranged in anticlockwise direction. A similar chart 73, bearing identical indicia 74 having a zero indicium 75, is mounted directly in back of the indicator 63 on the rear side of the housing.

A plurality of control means, whose purpose will hereinafter be more clearly described, are located in the housing 29, one of these being secured to the front of the pendulum frame 45 and one on its rear. The control means secured to the front of the pendulum frame 45 comprises a stamped bracket 76 fastened by means of screws 77 to the vertically extending struts of the frame (Figures IV, VII). That portion extending between the aforementioned struts is formed inwardly and slidingly fastened thereto is a plate 78. This plate is provided with two elongated slots 79 and two screws 80, which pass therethrough, are threaded into properly spaced holes in the bracket 76. Helical springs 81, through which these screws pass, serve to hold the plate 78 against the bracket yet permit it to be adjusted laterally. Adjusting means for this purpose comprise an ear 82 bent outwardly from the plate 78 into which an adjustment rod 83 is threaded. This rod extends laterally, penetrating the wall of the casing 29 and having a thumb knob 84 secured to that portion extending on the exterior of the housing. The adjustment rod 83, near its threaded end has a groove turned therein and this groove is positioned in an open-ended slot properly located in an ear 85 extending outwardly from the bracket 76 and parallel to the ear 82. The shoulders formed by this slot prevent all but rotative motion of the adjusting rod when turned by means of the thumb knob 84.

Spring clips 86, which are riveted to the plate 78, grippingly engage a magnetic mercury switch 87. Cooperating with the mercury magnetic switch 87 is a small permanent magnet 88 fastened, by means of a screw 89 and nut 90, to an ear 91 formed on the end of an arm 92. This arm 92 is of such length and riveted to the indicator 57 in such position that when the indicator 57 is in registration with the zero indicium 72 on the chart 70 the permanent magnet 88 is so positioned as to influence the position of the armature.

The control means secured to the rear of the pendulum frame 45 comprises a bracket 93, a plate 94, a magnetic mercury switch 95 and a threaded adjustment rod 96 having a thumb knob 97 on the exterior of the housing as well as means, similar to those incorporated in the control means secured to the front of the pendulum frame 45, for retaining the plate and the mercury magnetic switch as well as the adjusting rod 96. Similarly, an arm 98 on the indicator 63 supports a small permanent magnet 99.

To receive the material to be weighed out in equal batches, a receptacle 100 is provided. The receptacle in the present embodiment is substantially rectangular in form with a cylindrical bottom. Preferably the interior of this receptacle is smoothly finished to offer no opporunity for the material to stick therein when the receptacle is emptied. The receptacle, however, must be constructed of such material so that a hub 101, welded to one of the walls of the receptacle 100, rigidly supports this receptacle when mounted on the end of a shaft 102 on which it is locked by means of set screws 103. The shaft 102 is the output shaft of a speed reducing unit 104 which is adapted to reduce the speed of a motor 105 mounted on the speed reducing unit. An end of an armature shaft 106 of the motor is in operative engagement with a spring set magnetic brake 107. This brake is located within a housing which is mounted by means of brackets 108 on the casing of the motor 105. The opposite end of the output shaft 102 of the speed reduction unit 104 has secured to it a cam 109 which is adapted to engage a roller 110 mounted on an arm 111 of a limit switch 112. This limit switch is secured, by means of screws 113, to a formed bracket 114 fastened by means of screws 115 to the platform 12. Its function enters into the operation of the scale which will hereinafter be described.

The material to be weighed is usually stored in a hopper 116 having a spout 117 which opens into a funnel-like receiver 118 on the end of a vibratory trough 119. This trough is mounted on spring plates 120 that are secured to a base 121. Also mounted upon this base is a bracket 122 supporting an electromagnet 123 that acts on an armature 124 fastened to one of the spring plates 120. This electromagnet and armature cooperate to form a reciprocating electromotor.

Since the vibratory trough 119 must deliver the material into the receptacle 100 the base 121, with the members mounted thereon, is generally secured to a frame 125 which extends upwardly above a portion of a frame 126 upon which the base 11 is mounted. For the purpose of keeping a record of the number of weightments made, an electrically actuated counting mechanism 127 is provided. In this embodiment the counting mechanism 127 is mounted on a bracket 128 secured to the frame 125.

To receive the load when the receptacle is emptied there is stationed below the receptacle a funnel-like terminal 129 of a gravity conveyor which serves to deliver the material when dumped from the receptacle to a desired location.

Referring now to Figure III. For the purpose of counterbalancing the weight of the receptacle the motor and the gear reduction unit which are mounted on the platform 12, the end of the lever 17 which projects beyond the column-like casing 20 has fastened to it a loading box 130 and to the opposite end of this lever is pivotally secured the plunger of a dashpot 131 which serves to dampen the vibration of the device.

Since the position of the indicator 63 is adjustable relative to the position of the indicator 57, through the clutch members 58 and 60, it is necessary that the indicator 57 is held in registration with its zero indicium 72 when such adjustment is being made. To accomplish this, an index arm 132 is fastened to the hub 56 of this indicator in such position that a V notch 133 is adapted to receive a chisel pointed end 134 of a positioning plunger 135. The inner end of this plunger (Figures IV and VIII) is guided by a small formed bracket 136 secured, by means of a screw 137, to the pendulum frame 45. The other end of this plunger is mounted in a hole of the housing 29 through which it projects, there being a button 138 pinned to the protruding end. By applying pressure to the button 138 the chisel pointed end 134 enters the notch 133 in the member 132 and holds the indicator 57 against rotation. To assure that after the positioning operation of the indicator 63 the plunger 135 releases and frees the positioning member 132, there is provided a small formed bracket 139 secured, by means of screws 140, to an interiorly positioned flange in the housing 29. The plunger 135 also passes through an opening in this bracket and a helical spring 143, which is circumjacently mounted on this plunger and positioned between the bracket 139 and a collar 141 pinned on the plunger 135, urges the plunger out of engagement with the member 132 until a collar 142 pinned on the plunger 135 on the opposite side of the bracket 139 engages this bracket and prevents further movement, means (not shown) being provided to prevent the plunger 135 from rotating about its longitudinal axis so that the chisel pointed end 134 is always in proper alignment with the notch 133 in the member 132.

As previously stated, the small permanent magnets 88 and 99 must be, when the indicators 57 and 63 respectively are in registration with their zero indicia, in such positions relative to the magnetic mercury switches 87 and 95 that the normally open contacts are closed by drawing their armatures 145 and 146 respectively into engagement with the globules of mercury 147 and 148 in the bottoms of their exhausted glass capsules. If this is not the case the operator must, by turning the thumb knobs 84 and 97, adjust the plates 78 and 94 until this condition is obtained.

If, for example, it is desired to determine batches of material weighing 32 pounds each and deliver them exactly one minute apart the operator of the device applies pressure on the button 138 on the plunger 135 when there is no load in the receptacle 100 and the indicator 57 registers with its zero indicium 72. The chisel pointed end of this plunger now enters the notch 133 in the member 132 and holds the hand 57 in registration with the zero indicium 72. The operator, by placing the thumb of his other hand on the button 65 and by exerting a pulling force with his index and first fingers on the finger grip 62, then disengages the clutch plate 60 secured thereon from the clutch plate 58 and turns the finger grip 62 until the indicator 63 registers with that indicium on the chart representing 32 pounds. He then carefully releases the finger grip 62 and the cooperating spring 64 causes the faces of the clutch plates 58 and 60 to again frictionally engage each other, thus effectively conditioning the scale to determine loads weighing 32 pounds each. If, as hereinbefore stated, it is required that a batch of material be delivered each minute the operator now adjusts an electrical timing device 144 (Fig. IX) which is in the electric control circuit to cause a contact to be made in one minute intervals. Since such electrical timing devices are well known the one employed is not described in greater detail.

The operator now closes a normally open start switch 150 and current flows from one side of the source 151 through a lead 152, the switch 150, a normally closed stop switch 153 to the coil of a relay 154 and then through leads 155, 156 and 157 to the other side of the source. This energizes the coil of the relay 154 and closes its normally open contact 158. Current now flows from one side of the source through the lead 152, contact 158, lead 159, the normally closed stop switch 153, the coil of the relay 154, leads 155, 156, 157 to the other side of the source. This is a holding circuit and maintains the coil of the relay 154 energized when pressure is released from the normally open start switch. When this holding circuit is energized a synchronous motor of the timing device 144, which is connected in parallel with the holding circuit, is also energized and this starts to rotate. When the normally open contact 158 of the relay 154 is closed current flows through the lead 152, the contact 158, leads 159 and 160, normally closed contact 161 of a mechanical interlock relay 162, through leads 163, 164 and coil of a relay 167, leads 168, 155, 156, 157 to the other side of the source. This energizes the relay 167. The energization of the relay 167 closes its normally open contacts 169 and 170 and current now flows through leads 171 and 172 which energize the electromagnet 123 which, with the armature 124, comprises a reciprocating motor. The actuation of this motor imparts a series of vibratory impulses to the trough 119 and material in the hopper 116 is fed through the spout 117 to the vibratory trough 119 which feeds the material into the receptacle 100 which is positioned upon the platform 12 of the weighing device. As the material is accumulating in this receptacle the moment occasioned by the gradually increasing load is transmitted through the platform lever system (not shown) of the device, the connecting rod 13, lever 17, connecting rod 23, lever 26 through the equalizer 33 and the flexible metallic ribbons 34 to the pendulums 37. These, in the manner well known, move upwardly on their suspensions and their centers of mass outwardly and upwardly, thus their increasing moments counterbalance the load.

The rack 51, which partakes of the upward movement of the pendulums 37, rotates the pinion 52 with which it meshes and the indicator 57 rotates in an anticlockwise direction and the indicator 63 in a clockwise direction, as seen in Figures IV and III respectively, until the indicator 63 comes into registration with the zero indicium 75 of the series 74. In this position the magnet 99, secured on the arm 98 of the indicator 63, influences the armature 146 of the magnetic mercury switch 95 causing it to engage a mercury globule 148 thus closing a circuit from one side of the source through the lead 152, the contact 158, the leads 159 and 160, the contact 161, the leads 163 and 164, the mercury switch 95, the lead from the armature of the switch 95 to the coil of the relay 162, such coil and the leads 165, 156 and 157 to the opposite side of the source 151. The closing of this circuit energizes the coil of the mechanical interlock relay 162 and opens its normally closed contact 161 breaking the circuit which energizes the coil of the relay 167 thus permitting the normally open contacts 169 and 170 to open and de-energize the electromagnet 123 of the reciprocating motor thus stopping the flow of material to the receptacle 100. When this electromagnet is energized by the closing of the contacts 169 and 170 current also flows through leads 173 and 174 to a solenoid coil 175 of the counting mechanism 127 actuating its armature 176 and through an arm 177, pivotally engaged by the armature 176, operates the counting mechanism thus registering each time the reciprocating motor of the feeding device is energized. The breaking of the motor feed circuit permits the armature 176 to drop, conditioning the counting device for the next load.

The energization of the coil of the mechanical interlock relay 162 closes its normally open contact 178 and permits a latch 179 to lock an armature 180 of this relay in its closed position. The opening of the contact 161 of the mechanical interlock relay de-energizes the coil of the relay but the contact 178 thereof remains closed because the armature 180 is latched against its magnet by the latch 179. Closing of this normally open contact 178 permits current to flow from one side of the source through leads 157, 156, 155, 181, coil of relay 186, lead 182, the contact 178, leads 183 and 184 to a normally open contact 185 of the timing device 144. Closure of this contact by the timing mechanism 144 completes the circuit through the lead 159, contact 158 and lead 152 to the other side of the source, thus energizing the relay 186. When this relay is energized the normally open contacts 187, 188 and 199 are closed. Closure of the contact 199 inserts a hold-in circuit for the relay 186 into the circuit just described from the contact 178 through the lead 183, a lead 200, the contact 199, a lead 198, the lead 160 and the lead 159 to the contact 158. Therefore, the almost immediate reopening of the timer contact 185 does not de-energize the relay 186. Current then flows through the leads 152, 189, the contact 188, lead 190 and the windings of the motor 105 and through a lead 191, the now closed normally open contact 187, leads 181, 155, 156, 157 to the other side of the line. When this circuit is made, current also flows through leads 193 and 194 energizing a coil 195 of the brake 107 which is mounted on the motor 105. Energization of this coil raises a brake shoe 196 which operatively engages the armature of the motor 105, allowing this motor to freely rotate.

Since the motor 105 is directly coupled to the speed reduction unit 104 and the receptacle 100 is mounted on the output shaft of this speed reduction unit, the receptacle 100 rotates slowly discharging the material therein into the funnel-like terminal 129 when the receptacle assumes a position which permits the material to flow out. The receptacle however continues to rotate making a complete revolution, that is, until the cam 109, also mounted on the output end of the speed reduction unit shaft, engages the roller 110 on the arm 111 of the limit switch 112 closing the normally open contact 197 of this limit switch.

As the material flows from the receptacle 100 the pendulums 37 are overbalanced and they return to their initial position causing the indicator 57 to again register with its zero indicium and the indicator 63 to again register with the 32 pound indicium on its cooperating chart. The magnet 88 on the indicator 57 now draws the armature 145 of the magnetic mercury switch 87 into contact with the globule of mercury 147 closing a circuit. Current flows from one side of the current source through leads 152, contact 158, leads 159 and 160, lead 198, the now closed normally open contact 199 of relay 186, leads 200, 188, the armature 145, the globule of mercury 147 and through lead 201 to a magnet 202 which forms a part of the mechanical interlock relay 162 and then through leads 203, 204, the now closed normally open contact 197 of the limit switch 112 and through leads 205 and 157 to the other side of the line thus energizing the magnet 202 and withdrawing the latch 179, permitting contact 178 of the relay 162 to open and its contact 161 to close. The opening of the contact 178 de-energizes the relay 186 permitting the contacts 187 and 188 to open thus de-energizing the motor 105 and de-energizing the coil 195 permitting the brake shoe 196 to operatively engage the armature of the motor 105 and stopping its rotation. When the contact 161 is closed, the circuit energizes the electromagnet 123 of the vibratory feeding trough and material again flows into the receptacle, beginning another cycle of operation since the holding circuit in which the relay 154 is positioned is not de-energized until this circuit is broken by pressure upon the stop switch 153.

It will be seen that if material remains in the receptacle after being rotated the indicator 57 will not return to its zero position and the circuit energizing the motor 105 will not be broken since the magnet 88 under those conditions will not draw in the armature 145 of the magnetic mercury switch 87 and the motor will continue to rotate the receptacle until all the material has been discharged.

Having described the invention, I claim:

1. In a device of the class described, in combination, weighing mechanism, a material supply hopper, load receiving means operatively connected to said weighing mechanism comprising a rotatable receptacle, an electric motor operatively connected to said receptacle, means for conveying material from said supply hopper to said load receiving means, electric means for actuating said conveying means, load indicating means and load determining means comprising a pair of stationary charts bearing weight indicia, a pair of pivotally mounted indicators, means actuated by said weighing mechanism for rotating said indicators in response to material in said load receiving means, one of said indicators being adapted to be manually positioned relatively to its cooperating chart to such indicium on said chart indicative of the weight of such material to be determined, the other of said indicators being adapted to continuously indicate the weight of such material in said receptacle, a switch positioned adjacent the path of movement of each of said indicators, means on each of said indicators for actuating its cooperating switch, electrical means extending between said indicator actuated switches and said electric means for actuating said material conveying means and between said switches and said motor operatively connected to said receptacle, whereby the action of said feeding means is interrupted when said manually positioned indicator senses the presence of the desired amount of such material in said receptacle and said motor operatively connected to said receptacle is energized to rotate said receptacle to discharge such material, means for stopping the rotation of said receptacle and means for automatically re-energizing said electric means for actuating said material feeding means for another cycle of operation.

2. In a device of the class described, in combination, weighing mechanism, a material supply hopper, load receiving means operatively connected to said weighing mechanism and comprising a rotatable receptacle, an electric motor operatively connected to said rotatable receptacle, electrically actuated means for conveying material from said supply hopper to said load receiving means, load indicating means comprising a stationary indicia bearing chart and an indicator actuated by said weighing mechanism for indicating the weight of such material in said receptacle, a second stationary indicia bearing chart and an indicator adapted to be manually set to such indicium on said chart indicative of the weight of the desired load, a magnet on each of said indicators and a magnetic mercury switch positioned adjacent the path of each of said indicators and electrically connected to said material conveying means and to said motor operatively connected to said rotatable receptacle, that magnetic mercury switch positioned adjacent the path of said manually set indicator being adapted to stop the operation of said material conveying means when the desired weight of material has been deposited in said rotatable receptacle and to energize the motor operatively connected to said receptacle to rotate said receptacle and discharge such material, the other of said magnetic mercury switches being adapted to prevent de-energization of said motor operatively connected to said rotatable receptacle until all material in said hopper has been discharged.

3. In a device of the class described, in combination, weighing mechanism comprising a load supporting lever system, load counterbalancing means operatively connected to said load supporting lever system, load indicating means actuated by said load counterbalancing mechanism, a receptacle rotatably supported by said load supporting lever system, a motor for rotating said receptacle, a material supply hopper and electrically actuated means for conveying material from said material supply hopper to said receptacle on said load supporting lever system, said load indicating means including a shaft, an indicator fixedly mounted on said shaft, and an indicator adjustably mounted upon said shaft, magnets secured to said indicators, a pair of magnetic mercury switches, means for adjustably mounting said magnetic mercury switches adjacent paths described by said magnets on said indicators, and electrical connections between said magnetic mercury switches, said electrical conveying means and said motor for rotating said receptacle on said load supporting lever system, whereby the conveyance of such material is interrupted when a predetermined quantity has been conveyed into said receptacle on said lever system and whereby such material is subsequently discharged from said receptacle by rotation of said receptacle by said motor.

4. In a device of the class described, in combination, weighing mechanism comprising a load supporting lever system, load counterbalancing means operatively connected to said load supporting lever system, load indicating means actuated by said load counterbalancing mechanism, a rotatable receptacle supported by said load supporting lever system, a motor operatively connected to said rotatable receptacle, a material supply hopper and electrically actuated means for conveying material from said material supply hopper to said rotatable receptacle, said load indicating means including a shaft, an indicator fixedly mounted on said shaft, and an indicator adjustably mounted upon said shaft, magnets secured to said indicators, a pair of magnetic mercury switches, means for adjustably mounting said magnetic mercury switches adjacent paths described by said magnets on said indicators, and electrical connections between said magnetic mercury switches, said electrical conveying means and said motor operatively connected to said rotatable receptacle on said load supporting lever system, whereby the conveyance of such material is interrupted when a predetermined quantity has been conveyed into said rotatable receptacle on said lever system and whereby such material is subsequently discharged from said rotatable receptacle.

5. In a device of the class described, in combination, weighing means, weight indicating and load controlling means controlled by said weighing means, mercury magnetic switches actuated by said weight indicating and load controlling means, a rotatable receptacle mounted upon said weighing means, means for feeding material into said rotatable receptacle, means controlled by said load controlling means adapted to interrupt the feeding of such material when a predetermined amount thereof has been deposited in said receptacle, a motor operatively connected to said receptacle, means controlled by said controlling means for energizing said motor to rotate said receptacle to discharge such material from said receptacle, a switch controlled by said motor for interrupting the action of said motor when said motor has rotated said receptacle through an angle of substantially 360° and means controlled by said load indicating means for preventing such interruption of said motor until all such material in said receptacle has been discharged said means controlled by the load indicating means further comprising means for automatically re-energizing said material feeding means when all such material in said receptacle has been discharged.

6. In a device of the class described, in combination, weighing means, weight indicating and load controlling means controlled by said weighing means, mercury magnetic switches actuated by said weight indicating and load controlling means, a rotatable receptacle mounted upon said weighing means, means for feeding material into said rotatable receptacle, means controlled by said load controlling means adapted to interrupt the feeding of such material when a predetermined amount thereof has been deposited in said receptacle, a motor operatively connected to said receptacle, means controlled by said controlling means for energizing said motor to rotate said receptacle to discharge such material from said receptacle, a switch controlled by said motor for interrupting the action of said motor when said motor has rotated said receptacle through an angle of substantially 360° and means controlled by said load indicating means for preventing such interruption of said motor until all such material in said receptacle has been discharged.

7. In a device of the class described, in combination, weighing means comprising load supporting means, load counterbalancing means operatively connected to said load supporting means, load indicating means actuated by said load counterbalancing means and load determining means actuated by said load counterbalancing means, electrically controlled material feeding means, load receiving means cooperating with said weighing means, said load receiving means comprising a rotatably mounted receptacle, electrically controlled means for rotating said receptacle, and electrical means including electrical switches actuated by said load indicating and load determining means connecting said load feeding means to said load determining means, and connecting said load determining means to said receptacle rotating means and connecting said load indicating means to said receptacle rotating means for controlling said receptacle rotating means.

8. In a device of the class described, in combination, weighing mechanism including load counterbalancing mechanism, material feeding means, a material receiving receptacle mounted on said weighing means, weight indicating means operated by said load counterbalancing mechanism, weight determining means operated by said load counterbalancing mechanism, means for emptying material from said receptacle, electrical means controlled by said weight determining means for stopping operation of said material feeding means and for instigating operation of said means for emptying material from said receptacle and other electrical means controlled by said indicating means for stopping operation of said means for emptying material from said receptacle and for instigating operation of said material feeding means.

9. In a device of the class described, in combination, weighing mechanism including load counterbalancing mechanism, material feeding means, a material receiving receptacle supported by said weighing means, weight indicating means operated by said load counterbalancing mechanism, manually pre-settable load determining means operated by said load counterbalancing mechanism, means for emptying said receptacle, electrical means controlled by said load determining means for stopping operation of said material feeding means and for instigating operation of said means for emptying said receptacle at timed intervals and other electrical means controlled by said indicating means for stopping operation of said means for emptying said receptacle and for instigating operation of said material feeding means only upon the complete emptying of said receptacle.

10. In a device of the class described, in combination, weighing means comprising load supporting means, load counterbalancing means operatively connected to said load supporting means, load indicating means actuated by said load counterbalancing means and load determining means actuated by said load counterbalancing means, electrical switches actuated by said load indicating and said load determining means, material feeding means, load receiving means supported by said load supporting means, said load receiving means comprising a rotatably mounted receptacle, electrically controlled means for rotating said receptacle in response to signals from said load indicating and said load determining means, and electrical connections between said load feeding means and said electrical switches and between said electrical switches and said receptacle rotating means.

MARK A. WECKERLY.